Patented Oct. 31, 1922.

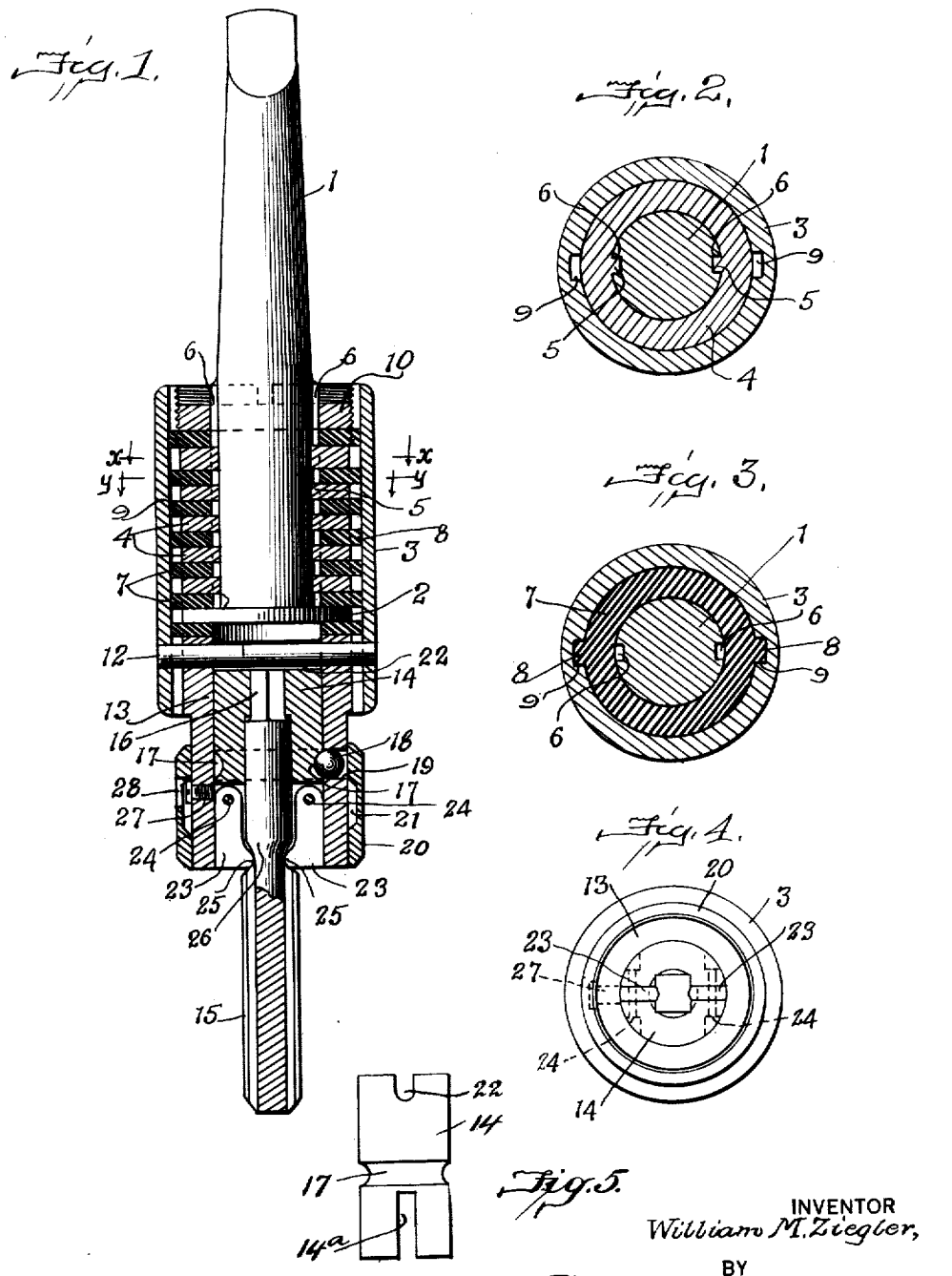

1,433,590

UNITED STATES PATENT OFFICE.

WILLIAM M. ZIEGLER, OF RICHMOND, INDIANA, ASSIGNOR, BY DIRECT AND MESNE ASSIGNMENTS, TO THE APEX MACHINE COMPANY, OF DAYTON, OHIO, A CORPORATION OF OHIO.

TOOL HOLDER.

Application filed April 4, 1921. Serial No. 458,520.

*To all whom it may concern:*

Be it known that I, WILLIAM M. ZIEGLER, a citizen of the United States, residing at Richmond, in the county of Wayne and State of Indiana, have invented certain new and useful Improvements in Tool Holders, of which the following is a specification, reference being had therein to the accompanying drawing.

This invention relates to improvements in tool holders designed to be operated by drill presses, such tools being either in the nature of taps to cut threads or reamers to enlarge openings or drills to bore holes.

The objects of the invention are, first, to provide a frictional connection or drive between the shank which is rotated by the drill press and the tool which is to be held in the holder and operated; second, to construct this friction drive of a series of friction disks made of fiber and steel, the disks of these materials being alternated, and one set of disks interlocked with the driving shank and the other with a casing to which is connected, by intermediate devices, the tool to be operated; third, to adapt the collet or tool-holder proper to be readily removed from the sleeve which carries it; and fourth, to provide dogs or detents which are adapted to engage with the tool to keep it from dropping out of the collet.

In the accompanying drawings:

Fig. 1 is a partial side elevation and partial vertical sectional view of my improved tool holder;

Fig. 2 is a transverse sectional view taken through the line x—x of Fig. 1;

Fig. 3 is a like sectional view taken through the line y—y of Fig. 1;

Fig. 4 is an inverted or bottom view with the tool removed, and Fig. 5 is a detail view of the collet showing certain grooves therein.

The numeral 1 indicates a shank or shaft adapted to be mounted in the spindle of a drill press or in any other machine or instrumentality capable of rotating the shank and advancing it in the direction of the work to be operated upon. This shank has a flange or base 2. The shank is inserted in a casing 3 containing a series of steel friction disks 4 each having ribs 5 which enter grooves 6 in the shank, whereby these steel friction disks are interlocked with the shank and are made to rotate with it.

Also placed within the casing 3 are fiber friction disks 7 which alternate with the steel friction disks and which fiber disks are formed with ribs 8 that fit in grooves 9 in the interior of the casing 3, whereby the fiber disks are interlocked with the casing.

Therefore, when the spindle and its interlocked friction steel disks are rotated they will transmit their motion to the intermediate fiber friction disks and through them to the casing 3. A threaded nut 10 is screwed into the casing and against the upper disk to bind all of the disks firmly together to insure such frictional contact as will effectively transmit rotary motion from the shank and its disks to the casing and its disks.

The lower portion of the casing is provided with a transverse pin 12 on which is hung a sleeve 13 whose upper end forms the support for the adjacent or first friction disks, as clearly shown in Fig. 1. Within the sleeve 13 I removably mount a collet 14 bored out to receive the tool, as, for instance, a thread cutting tap 15, a part of whose shank, as at 16, is square or of other angular shape, so as to interlock rotatably with the collet. The collet has a groove 17 in which a locking ball 18 mounted in a pocket 19 in the sleeve 13 is adapted to fit to keep the collet from coming out of the sleeve. A band 20 fitting on the sleeve is arranged to keep the ball in the groove 17 except when the collet is to be removed, in which case the band is slid on the sleeve until the recess 21 in the band comes opposite to the ball, which will permit the ball to move out of the groove 17 and allow the removal of the collet. But immediately on the reinsertion of the collet and the repositioning of the band, as shown in Fig. 1, the ball will re-enter the groove 17 and again hold the collet.

In order to insure the rotation of the collet, and therefore of the tool with the sleeve 13, the collet has a deep groove 22 in its upper end through which passes the pin 12. Thus while the collet can be removed without interference by the pin, still the pin engages the collet rotatably and thus causes it to rotate with the other rotating members. In order to retain the tap, drill, reamer or other tool in the collet I provide a plurality of dogs or detents 23 pivoted at 24 to the collet 14 and fashioned with projections 25 which enable them the more readily to engage the tool, as by extending under the conventional shoulder 26 or into any other configuration conventional in these tools or specially formed in them to enable the dogs to hold the tools against dropping out of the collet.

A screw 27, screwed into the sleeve 13, through an opening 28 in the band, acts to keep the band from working off of the sleeve.

In order to insert and remove a tap, drill, reamer or other tool into and from the collet 14, the collet is removed from within the sleeve 13. This is done by slipping the band 20 upward to bring the recess 21 opposite the ball 18. This permits the ball to recede into the recess 21 and move out of the groove 17 in the collet. The collet can then be withdrawn from the sleeve, when the detents 23 will swing in or out through slots 14ᵃ in the lower part of the collet. After the tool has been inserted in the collet or removed therefrom, the collet is returned to its position within the sleeve and the band is dropped down to its original position shown in Fig. 1.

It will now be observed that my invention provides for an effective and powerful frictional connection between the driving shank and the driven casing, and comprises also a ready and direct transmission of the rotary motion of the casing to the collet and thence to the tool, while also providing convenient and practical means for retaining the collet in the sleeve and the tool in the collet, yet admitting of the removal of the collet from the sleeve and of the tool from the collet.

And it will further be observed, and this is a major feature of advantage, that with my invention in case of the tool becoming obstructed or fouled in any way so that it cannot continue to rotate, the frictional disks will permit the shank to continue to rotate until it can be stopped, yet without breaking or straining any of the parts. In other words, that whenever the tool becomes clogged or fouled and cannot revolve further, the frictional disks permit a sliding motion which will allow the shank to continue to rotate for the moment. In this way the breakage of the parts is entirely avoided resulting in a safe and highly dependable organization of parts.

Having thus fully described my invention, what I claim as new and desire to secure by Letters Patent, is:—

1. In a tool holder, the combination with a driving shank adapted to receive rotary motion from a drill press spindle, and a series of frictional disks mounted on and engaging with said shank, of a casing, a series of intermediate frictional disks mounted within and engaging said casing, and a device connected directly to said casing and adapted to receive and hold a tool, whereby rotary motion applied to said shank is frictionally applied to said casing and positively applied by said casing to said holding device and thence to the tool.

2. In a tool holder, the combination, with a shank and a series of frictional disks connected therewith, of a casing and a series of frictional disks connected with it, means to frictionally bind said disks against each other, a pin carried by the casing, a sleeve connected to the casing by said pin, a collet within the sleeve arranged to rotate therewith and adapted to receive and rotate a tool.

3. In a tool holder, the combination, with a shank and a series of frictional disks connected therewith, of a casing and a series of intermediate disks connected to it, means to bind said disks frictionally together, a pin carried by the casing, a sleeve mounted on the pin, a collet within the sleeve engaging with the pin and bored to receive a tool, and detents carried by the collet and adapted to maintain the tool in the collet.

4. In a tool holder, the combination, with a shank having a flange at its base, of a casing having a transverse pin, a sleeve mounted on said pin and adapted to support said flange, a series of frictional disks connected with the casing, the lower of which is supported by the sleeve, and a series of frictional disks connected with the shank, the disks of one series alternating with those of the other series, and a threaded nut screwed into the casing and acting to frictionally bind the disks together.

5. In a tool holder, the combination with a casing and a transverse pin carried thereby, of a sleeve through which said pin extends, a collet within the sleeve grooved to receive the pin and grooved to receive a ball, a ball fitted in said groove and between the collet and sleeve, a band on the sleeve to retain the ball, detents pivoted to the collet to hold a tool, the collet being bored to receive such tool, a part of the bore being angular to match an angular part of the tool to cause the tool to rotate with the collet.

In testimony whereof, I affix my signature.

WILLIAM M. ZIEGLER.